(12) United States Patent
Panin et al.

(10) Patent No.: US 10,069,911 B2
(45) Date of Patent: Sep. 4, 2018

(54) SYSTEM AND METHOD FOR PRIORITIZATION OF DATA BACKUP AND RECOVERY TRAFFIC USING QOS TAGGING

(71) Applicant: Acronis International GmbH, Schaffhausen (CH)

(72) Inventors: Andrey Panin, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 39 days.

(21) Appl. No.: 15/260,510

(22) Filed: Sep. 9, 2016

(65) Prior Publication Data

US 2017/0078208 A1    Mar. 16, 2017

Related U.S. Application Data

(60) Provisional application No. 62/218,596, filed on Sep. 15, 2015.

(51) Int. Cl.
*H04L 29/08* (2006.01)
*H04L 12/851* (2013.01)

(52) U.S. Cl.
CPC .......... *H04L 67/1095* (2013.01); *H04L 47/24* (2013.01); *H04L 67/322* (2013.01)

(58) Field of Classification Search
CPC .... H04L 67/1095; H04L 47/24; H04L 67/322
See application file for complete search history.

(56) References Cited

U.S. PATENT DOCUMENTS

| 7,940,756 | B1 * | 5/2011 | Duffy | H04L 41/50 370/235 |
|---|---|---|---|---|
| 2004/0205206 | A1 * | 10/2004 | Naik | H04L 29/06 709/230 |

* cited by examiner

*Primary Examiner* — Thai Nguyen
(74) *Attorney, Agent, or Firm* — Arent Fox LLP; Michael Fainberg

(57) ABSTRACT

Disclosed are systems, methods and computer program products for prioritization of data backup and recovery traffic using quality of service (QoS) tagging. An example method includes specifying Quality of Service (QoS) requirements for different types of network traffic, including QoS requirements for one or more data backup or recovery tasks, wherein the QoS requirements correspond to a network transmission priority level of the network traffic; receiving a data backup or recovery task, by a backup application; analyzing the data backup or recovery task, by the backup application, to determine its QoS requirements, based on the specified QoS requirements for data backup or recovery tasks; applying one or more QoS tags to data packets associated with the data backup or recovery task, by the backup application, based on the determined QoS requirements; and assigning a network transmission priority level to the data packets, based on its QoS tags.

21 Claims, 5 Drawing Sheets

SYSTEM AND METHOD FOR PRIORITIZATION OF DATA BACKUP AND RECOVERY TRAFFIC USING QOS TAGGING

CROSS-REFERENCE TO RELATED APPLICATION

This patent application claims priority to U.S. Provisional Patent Application No. 62/218,596, filed on Sep. 15, 2015, which is hereby incorporated by reference in its entirety.

TECHNICAL Field

The disclosure relates generally to the field of data backup, and more specifically to the systems and methods for prioritization of data backup and recovery traffic using quality of service (QoS) tagging.

BACKGROUND

Modern corporate enterprises have large volumes of critical data, such as work documents, emails, financial records, etc., that requires backup and recovery to prevent data loss. During backup procedure, data stored on client workstations and servers is sent to a backup storage. During recovery procedure, backup data is retrieved from the backup storage and reconstructed on client workstations and servers. Since the amount of data that requires backup can be very large, which is even for a medium-size company can be measured in hundreds of terabytes, the backup process can be very resource intensive and time consuming. Furthermore, provided that data backup has to be performed frequently, e.g., daily, semi-weekly, the backup process can be quite onerous on the corporate network.

In addition to backup traffic, there are many other types of data transmissions on typical corporate networks, such as emails, which may include large attachments, web browsing traffic, VoIP calls, audio/video streaming, administrative traffic, etc. (which will be commonly referred herein as non-backup traffic). If a lot of traffic passes at the same time on the network, the network bandwidth may be come insufficient to support all this traffic, and the data packets will be queued by network routers. In this case, data packets may be received at its destination with delay (or even lost). For some services, delays are not acceptable (such as VoIP, video/audio streaming, etc.). And, delays caused by large volume of backup traffic may significantly affect the quality of these and other time-sensitive transmissions on the network.

Therefore, there is a need to differentiate data backup and recovery traffic from other types of traffic to improve data throughput and overall efficiency of a corporate network.

SUMMARY

Disclosed are systems, methods and computer program products for prioritization of data backup and recovery traffic using quality of service (QoS) tagging in order to increase throughput and to minimize packet loss and latency for non-backup, time-sensitive traffic. In one exemplary aspect, the backup system specifies QoS requirements for data backup and recovery traffic on the network and specifies priority of transmission requirements for different types of QoS traffic. The system then generates/receives a data backup or recovery task and analyzes the data backup or recovery task to determine its QoS requirements. The system then sets one or more QoS tags for the data packets associated with the data backup or recovery task and selects a network transmission priority for the data packets based on the QoS tags. Finally, the system generates a queue of data packets in order of the selected priority of data packets.

In a general aspect, the present disclosure provides a computer-implemented method for data backup, the method comprising: specifying Quality of Service (QoS) requirements for different types of network traffic, including QoS requirements for one or more data backup or recovery tasks, wherein the QoS requirements correspond to a network transmission priority level of the network traffic; receiving a data backup or recovery task, by a backup application; analyzing the data backup or recovery task, by the backup application, to determine its QoS requirements, based on the specified QoS requirements for data backup or recovery tasks; applying one or more QoS tags to data packets associated with the data backup or recovery task, by the backup application, based on the determined QoS requirements; and assigning a network transmission priority level to the data packets, based on their QoS tags.

In an alternative aspect, the data backup or recovery task includes information comprising at least one of: a type of data backup or a time of data backup.

In an alternative aspect, assigning QoS tags to data packets associated with the data backup or recovery task is based on at least one of the type of data backup or the time of data backup.

In an alternative aspect, the type of data backup is selected from one or more of: an ordinary planned backup, an event-based backup, or an urgent backup resulting from a predefined disaster condition.

In an alternative aspect, the data backup time is selected from one or more of: a peak time, a nighttime, and a weekends or holiday.

In an alternative aspect, the network transmission priority level is assigned to the data packets based upon a plurality of QoS tags applied to each data packet.

In an alternative aspect, the method further comprises a step of: transmitting the QoS-tagged packets to one or more QoS-enabled routers on a same local network as a device running the backup application, wherein the router(s) are configured to receive QoS-tagged backup or recovery traffic and to send it over the local network based on its QoS tags.

In an alternative aspect, the backup application is implemented via firmware on a network device.

In a another general aspect, a system for data backup is disclosed, the system comprising one or more hardware or virtual processors configured to perform the steps of any of the methods described herein.

In a another general aspect, a non-transitory computer readable medium comprising computer executable instructions for performing data backup is disclosed, the system comprising one or more hardware or virtual processors configured to perform the steps of any of the methods described herein.

The above simplified summary of an exemplary aspect serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects of the present disclosure are described herein in the context of systems, methods and computer program products for prioritization of data backup and recovery traffic using QoS tagging. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Many network protocols have an ability to mark different types of network traffic. Usually, it is used for processing the traffic in queues. Indeed, most network protocols have dedicated fields for tagging or marking of packet priorities, e.g., "Class of Service" in Ethernet protocol, or "DiffServ" in IP protocol (which will be commonly referred herein as Quality of Service tagging). Some routers can identify different types of traffic packets automatically (for example, VoIP packets) and give them a high or lower priority. However, the best way to implement QoS tagging is to mark network traffic as close as possible to the source of the traffic. Therefore, in the context of data backup and recovery, it is proposed, in accordance with one exemplary aspect, to mark backup and recovery traffic at the level of a backup application, which will allow flexibility in management of backup and recovery traffic in a local network.

QoS tagging can be implemented at a high level by classification of network traffic, wherein different forms of network traffic flowing across the network are categorized into different classes (e.g., Telnet, FTP, HTTP). Routers on a local network may then be configured to prioritize transmission of the different classes of traffic. This implementation is sufficient for some purposes. However, it is limited in that it typically requires configuration of every router in the local network to ensure proper functionality. In many cases, a more nuanced approach is preferable, such as QoS tagging at the packet-level by an application prior to transmission. Once packets are tagged, routers and switches on the network can evaluate the tags and prioritize network traffic in accordance with a pre-established policy. In some aspects, tagging may be implemented at Layer 2 (i.e., the Date Link Layer) of the Open systems Interconnection (OSI) model or at Layer 3 (the Network Layer) of the OSI model. In many aspects, tagging will be applied to data packet headers. Data packets, or more generally network traffic, may be tagged with a single tag or a plurality of concurrent tags, allowing for the establishment of fine-grained prioritization rules.

Figure 1:
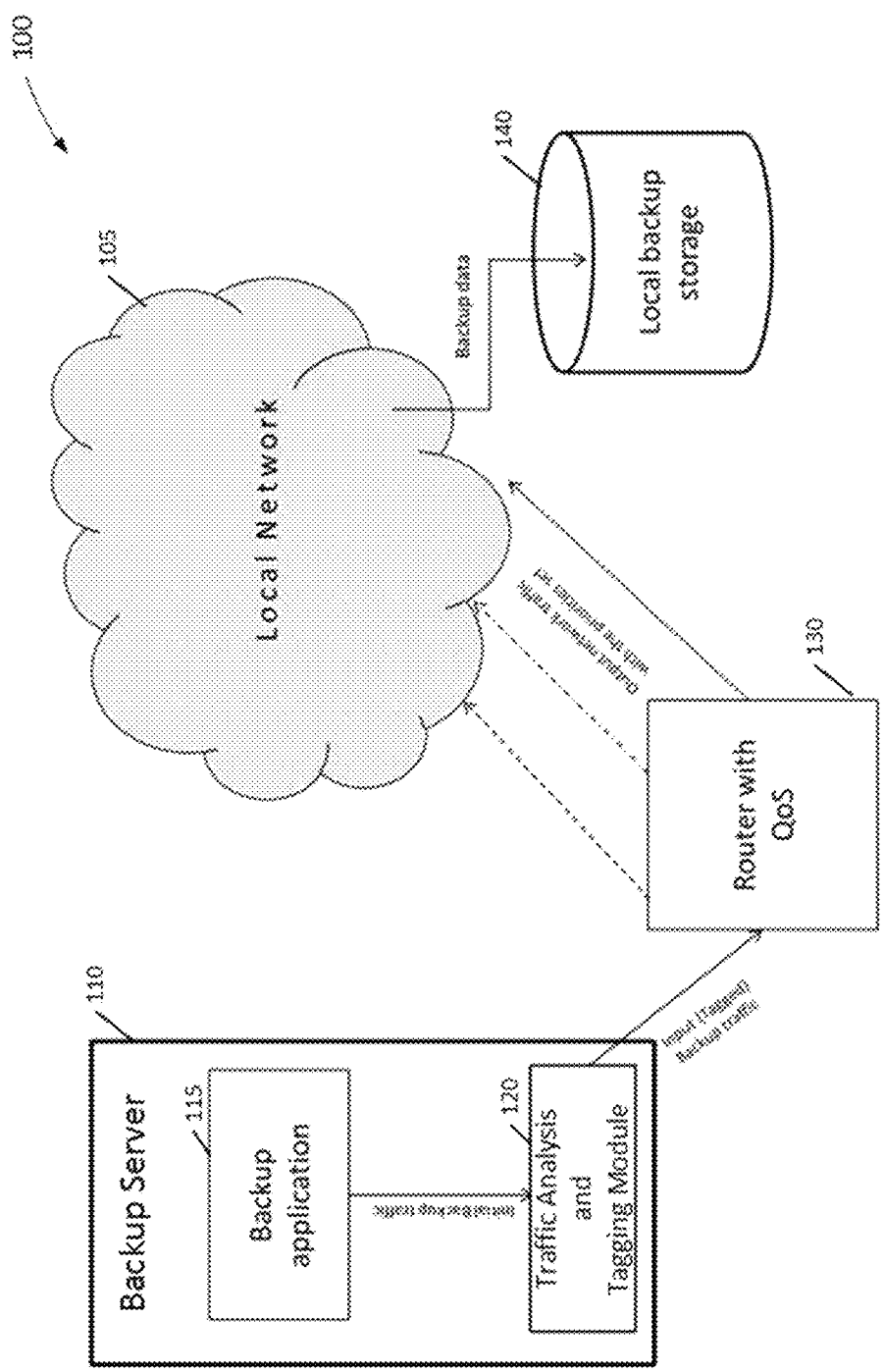
FIG. 1 is a diagram illustrating an exemplary configuration of a system for prioritization of backup and recovery traffic on a network using QoS tagging.

FIG. 1 depicts a configuration of an exemplary system for prioritization of backup and recovery traffic on a network using QoS tagging. The system 100 includes a backup server 110, which runs a backup application 115 configured to generate data backup and recovery tasks for a corporate computer network, though the present methods may be implemented on any other type of network. The backup application 115 includes a traffic analysis and tagging module 120 configured to analyze new data backup and recovery tasks and mark them with various QoS tags, which control transmission priority of this data across a local network 105 (such as a corporate Ethernet). The system 100 further includes one or more routers 130 that support QoS protocols and which are configured to receive QoS tagged backup (or recovery) traffic from the backup server 110 and non-backup traffic from other connected computer devices, such as user workstations, servers, VoIP phones, and send it over the local network 105 based on priorities set in the input data packets. The system 100 also includes a backup storage 140 connected to the local network 105 and configured to store backup data received from the backup server 110 via routers 130 and to provide recovery data to the backup server when requested.

Figure 2:
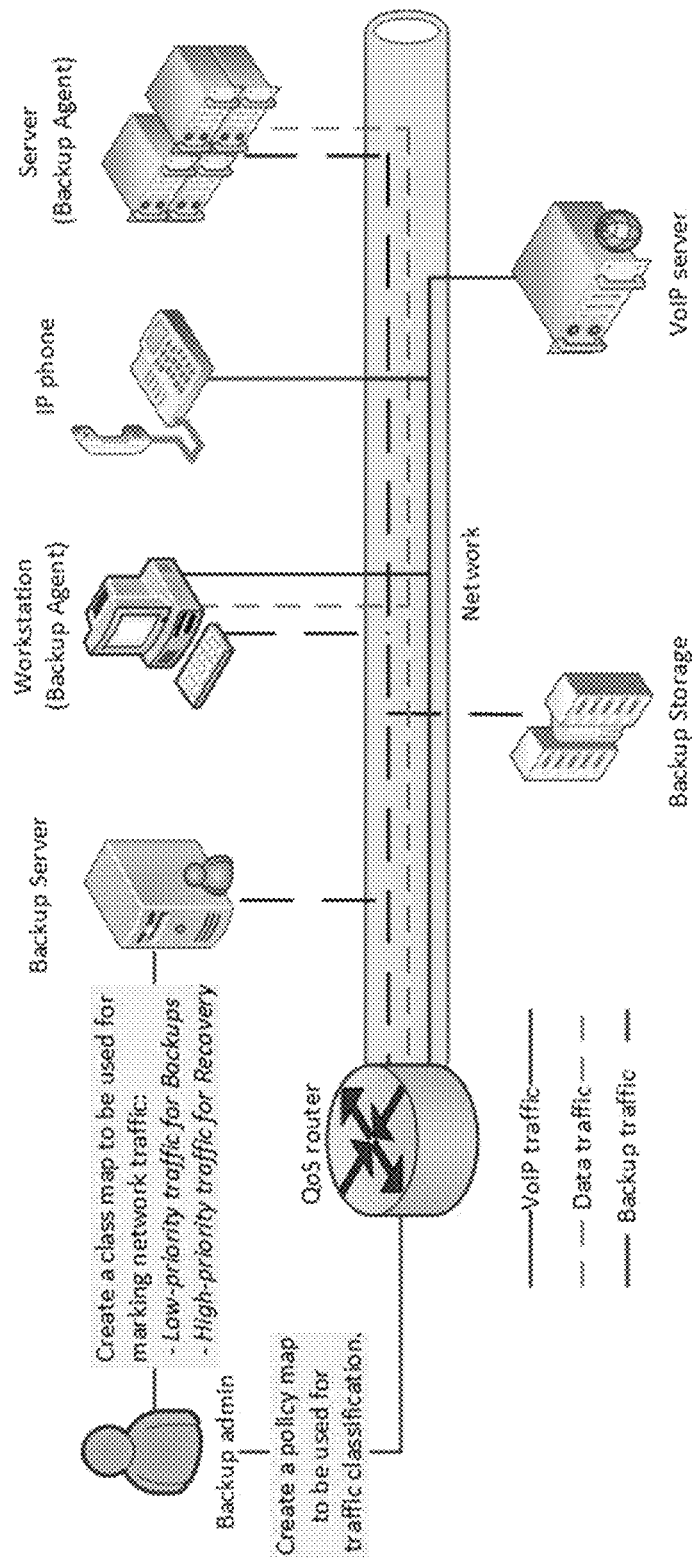
FIG. 2 is a diagram illustrating an exemplary process for prioritization of backup and recovery traffic using QoS tagging.

FIG. 2 depicts an exemplary process for prioritization of backup and recovery traffic using QoS tagging. As shown, a backup administrator may create a class map for traffic tagging based on QoS requirements for different types of network traffic. In one aspect, the priority may be designated by a numbers on levels (e.g., from 1 to 10, with the highest priority traffic being marked as 1, and the lowest priority traffic marked as 10). Other tagging mechanisms and scales may be implemented as well. For example, a class map may specify that backup traffic has to be set to the lowest QoS priority (e.g., priority 10), and recovery traffic has to be set to the highest QoS priority (e.g., priority 1) relative to backup traffic and other non-backup traffic, such as VoIP traffic, audio/video streaming traffic (not shown) and data traffic (e.g., emails, Internet traffic, administrative traffic, etc.). In another example, recovery traffic may be set to a lower priority (e.g., priority 5) than VoIP traffic (e.g., priority 1). The administrator may then use a class map to configure (using a GUI or command line) the backup application 115 running on the backup server 110 to allow tagging of each backup plan/job/task with appropriate QoS tags. In some implementations, different priority levels may be assigned based upon multiple QoS tags or based upon both a type of traffic parameter and another parameter or token (e.g., a destination address on the local network, or a secondary tag in a packet header), providing additional options for customization. For example, backup data may be labeled with a primary tag indicating a type of data backup task (and commensurate priority level) as well as a secondary tag related to a destination address for a specific backup server.

Multiple tags, in this scenario, may be used to assign varying degrees of priority to the same type of backup task intended for transmission to a local or remote backup server.

In some aspects, the backup application 115 may be configured to interact with, update, and/or modify the class map and traffic prioritization policy established by a network administrator. Modification of the established policy may be required, e.g., to efficiently respond to changing network traffic conditions, based on user input at the backup application, or in response to a conditional trigger. Similarly, in some aspects, the class map and traffic prioritization policy may be updated by a remote user or server configured to interact with the backup application 115.

In some aspects the class map may specify different priority levels based upon variable parameters. For example, different priority level policies may be in effect at different times, e.g., during business hours, at night, on a weekend. Tagging policies may also be conditional, such that different priority levels may be assigned if two different types of network traffic are detected simultaneously or within a given time period, allowing for reprioritization as network conditions change. Priority levels may also be implemented using a scheme that gradually increases or decreases the priority level of particular traffic types based upon a pre-established criteria such as a counter, a conditional event, or any other threshold. In some aspects, the priority scheme may gradually increase the priority of traffic associated with a particular data backup task until confirmation is received from a local backup storage 140 that data has been successfully received.

In one exemplary aspect, the analysis and tagging module 120 of the backup application 115 is configured to automatically analyze new backup tasks and tag them with appropriate QoS tags according to the class map provided by the backup administrator (and depending on any certain known router standards). For example, the backup application may use a one or more parameters associated with the type of backup and/or a time of backup, which are typically specified in a new backup task, to determine what QoS priority should be assigned to each backup task. The types of backup may include, but are not limited to: an ordinary planned backup (e.g., daily or weekly recurring backup), an event based backup (e.g., software update triggered backup), and an urgent backup in case of some disaster (e.g., computer virus detection, fire in a server room, flooding of a data center, etc.). The backup times may include, but are not limited to: peak time, nighttime, and weekends/holidays. Accordingly, using a combination of these (and other) parameters, the backup application can tag the new backup traffic with different QoS tags. For example, an ordinary planned backup task scheduled for weekends may be marked with a low priority tag (e.g. priority 10), while an urgent emergency backup task scheduled for a peak time may be marked with a high priority tag (e.g., priority 1). The backup server may then transmit the tagged backup traffic to QoS routers according to its priorities, which were defined by QoS tags.

In some aspects, the backup application 115 may be configured to interact with one or more sensors or programs capable of detecting that a disaster has occurred or is imminent. For example, the backup application 115 may interact with or be integrated with an antivirus component capable of detecting the presence of a virus on the device running the backup application 115 or on another device located on the local network. The backup application 115 may also be configured to interact with a sensor capable of detecting an environmental disaster (e.g., a moisture sensor capable of detecting flooding of a data center). In some aspects, the backup application 115 may be further configured to prepare and transmit an urgent backup in response to hazardous conditions. In many cases, an urgent backup will be assigned a high priority. However, in select aspects the backup application 115 may be configured to modify a preexisting prioritization policy to increase the priority of an urgent back set in response to conditions that meet pre-established criteria for a disaster.

As shown in FIG. 2, the backup administrator can also create a policy map specifying traffic queuing requirements for QoS routers 130 based on the QoS tags of incoming network traffic, and use it to configure the operation of QoS routers 130. The policy map may specify rules for queuing network traffic for different QoS tags. For example, data packets marked with high-priority QoS tags may have to be placed in a transmission queue ahead of data packets marked with low-priority QoS tags. In another example, the policy map may specify time limitations on transmission of data packets marked with certain QoS tags. For example, packets marked with low priority tags (e.g., priority 7-10 on a 10-point scale) may have to be transmitted within 2 hours of reception. As noted above, prioritization may employ any algorithms known in the art to be suitable for prioritization and/or shaping of network traffic. It is preferable to employ an algorithm that ensure efficient transmission of high priority traffic while avoiding protocol starvation with respect to low priority traffic.

Figure 3:
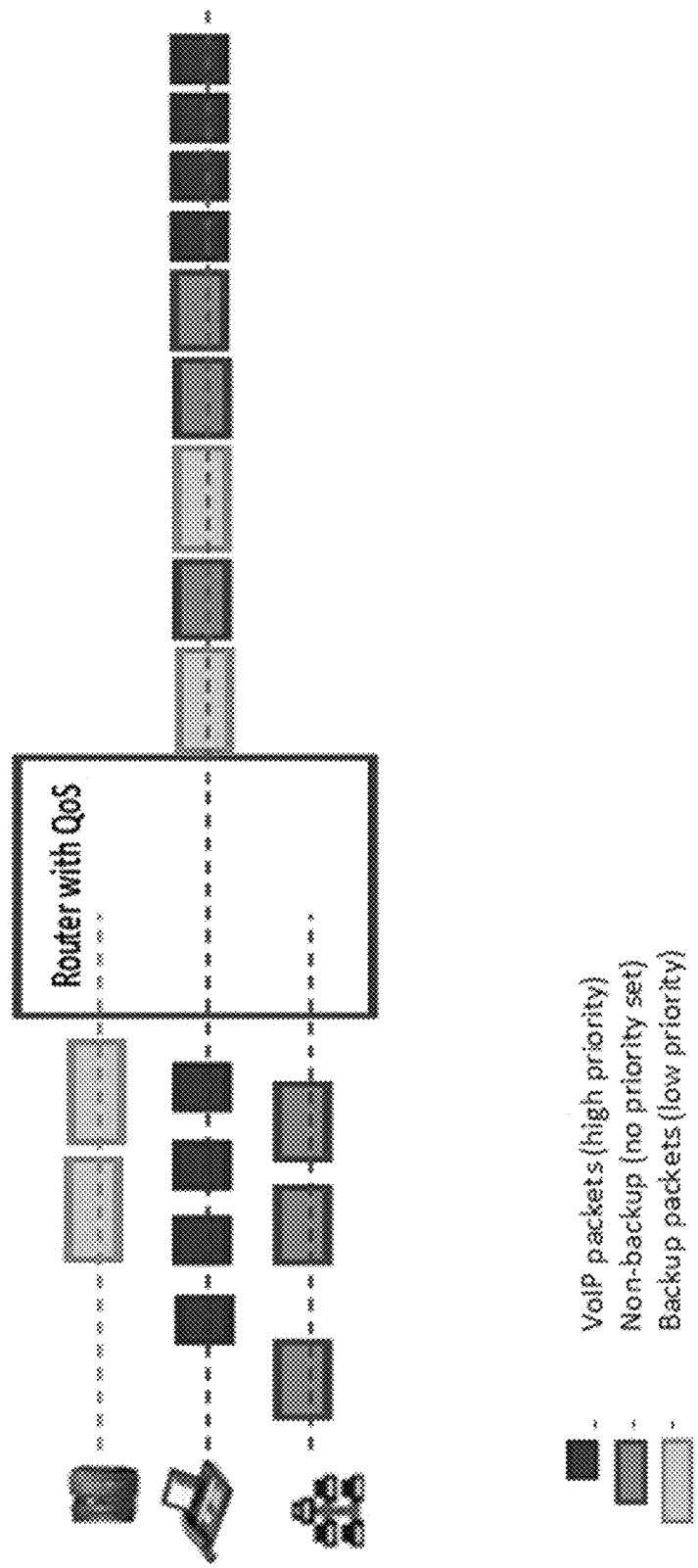
FIG. 3 is a diagram illustrating an exemplary process of packet queuing using QoS tags.

FIG. 3 depicts an exemplary process of packet queuing according to QoS tags. A QoS router will put first in its transmission queue VoIP traffic (high-priority QoS tags), followed by non-backup traffic (no priority tags), and finally followed by low priority backup traffic. In this manner, throughput is increased and latency for non-backup and VoIP traffic is minimized. In its simplest form, packet queuing may be implemented by a priority queue, wherein packets are arranged and transmitted packets based on their priority level with untagged packets typically treated as if tagged with normal priority. However, this implementation is non-ideal in many scenarios because of the possibility for protocol starvation if the high priority queue is too active. As such, more complex queuing algorithms may be implemented, such as weighted fair queuing (WFQ), class-based WFQ, or any other prioritization algorithm suitable for network traffic management.

In some aspects, the backup application 115 may include an interface for interacting with one or more QoS routers located on a given network. The interface may be a command line or GUI based interface, and in some implementations may allow the viewing or configuration of QoS policies in effect on a given QoS router located on the same network. For example, the interface may allow a user to enable a different packet queuing scheme or to temporarily disable QoS routing. In some aspects, the backup application 115 is configured to communicate with one or more QoS routers on the same local network to adjust the queuing scheme in response to the execution of a preselected application on the computer running the backup application.

As noted in the preceding example, the disclosed methods and systems may be implemented in a manner that allowed network administrators to maintain or optimize the QoS of particular classes of network traffic while allowing data backup and restore operations to proceed with minimal latency. To accomplish this goal, in some aspects, the QoS prioritization rules require assignment of a low to medium priority level to some or all data backup traffic (e.g., routine data backup traffic may be limited to low priority, subject to potential escalation of the priority level following a preassigned trigger).

In some aspects, the backup application 115 may also be configured to monitor network traffic, generate a list of classes of network traffic detected at a given time-point or over a given timeframe, and then adjust the priority of particular classes of network traffic accordingly based upon a policy established by a network administrator, preset, configuration file, or other source. For example, the backup application 115 may detect that several classes of network traffic are being actively transmitted within a 5-minute monitoring interval, including traffic related to a data backup task, latency-sensitive applications (e.g., streaming video or VoIP traffic), and web browsing. The backup application 115 may then assign a priority level to the data backup traffic that ensures that it is not the highest priority class of network traffic currently being transmitted. As monitoring continues and various classes of network traffic are detected, the backup application 115 may continue to dynamically assign (or modify) priority levels assigned to the data backup and restoration traffic (or other classes of network traffic) to maintain a policy that ensure that the selected class of traffic is never the highest priority traffic being transmitted. This dynamic calibration process is useful in that it ensures that latency-sensitive traffic is not affected by persistent but less critical traffic, such as routine data backup traffic. Similar policies may be implemented enforcing particular thresholds, such as average, minimum, or maximum priority levels to data backup or other classes of network traffic, depending on the needs of a particular implementation. It is understood that the dynamic calibrations steps described in this context may be incorporated into any of the aspects described herein.

In some aspects, the backup application 115 may be configured to monitor local network parameters, such as bandwidth utilization, and to adjust the class map and prioritization rules in effect based upon the results of the monitoring. For example, if a sustained period of low network utilization is detected, the backup application may adjust the priority rules to increase the transmission priority of routine data backup traffic that would otherwise be labelled with a low priority tag. Similarly, the backup application 115 may reduce the priority of data backup (or other traffic) in response to detection of VoIP traffic or a reported execution of one or a preset threshold of VoIP applications on one or more devices on the local network.

In some aspects, one or more of the QoS routers on the local network may be configured to report QoS information to the backup application, e.g., average packet delay, delay variation (jitter), error rate, either as an aggregate value or broken down by traffic type. The backup application 115 may in turn be configured to utilize this information to modify the class map and/or prioritization policy previously established by a network administrator. For example, the backup application 115 may be configured to increase or lower priority for given traffic types when QoS information reported from the QoS router indicates non-optimal routing.

Figure 4:
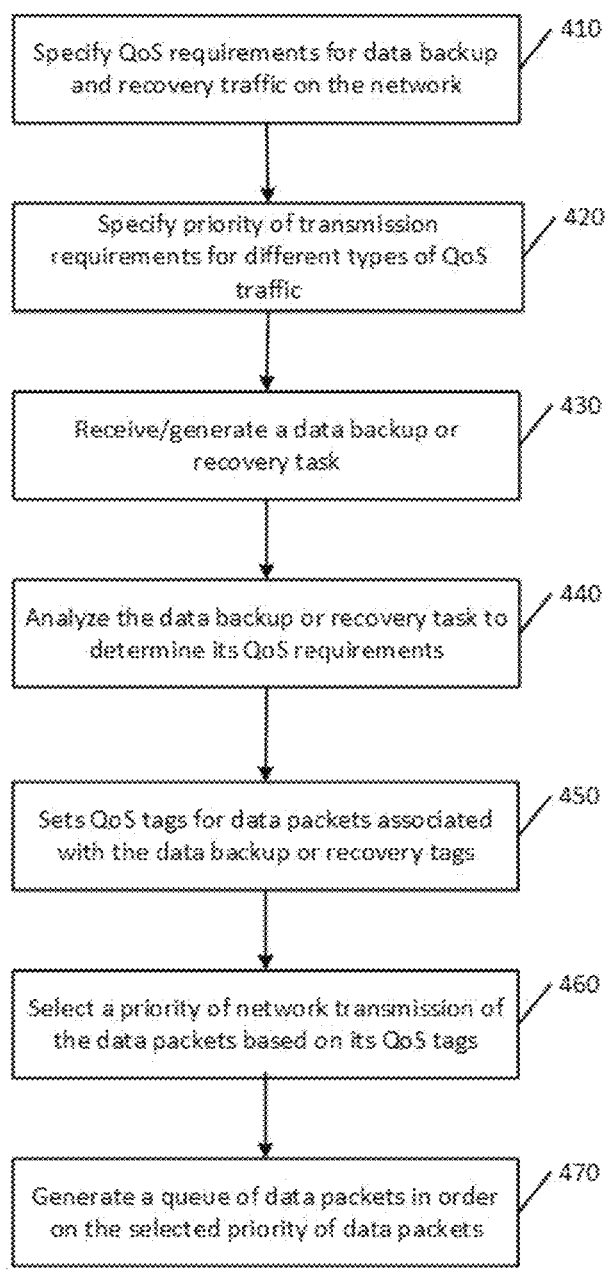
FIG. 4 is a flow diagram illustrating an exemplary method for prioritization of backup and recovery traffic on a network using QoS tagging.

FIG. 4 depicts an exemplary method for prioritization of backup and recovery traffic on a network using QoS tagging. The method 400 may be implemented by the system 100 shown in FIG. 1. In the exemplary method illustrated by this figure, at step 410, the system 100 specifies QoS requirements for data backup and recovery traffic on the network. At step 420, the system 100 specifies priority of transmission requirements for different types of QoS traffic. At step 430, the system 100 receives/generates a data backup or recovery task. At step 440, the system 100 analyzes the data backup or recovery task to determine its QoS requirements. At step 450, the system 100 sets QoS tags for data packets associated with the data backup or recovery tags. At step 460, the system 100 selects a priority of network transmission of the data packets based on its QoS tags. Finally, at step 470, the system 100 generates a queue of data packets in order of the selected priority of the data packets for transmission of the data packets over the network.

While many of the aspects described herein contemplate that the disclosed methods (e.g., the exemplary method of FIG. 4) may be carried out by a backup application 115 running on a backup server 110, in various other aspects these methods may be implemented via firmware installed on a network device. Network devices include, but are not limited to, access points, switches, interne appliances which may be configured to implement the QoS prioritizing and/or routing functionality described herein to efficiently prioritize and route backup and recovery traffic while simultaneously allowing traffic related to other activities to coexist on the network with negligible performance loss. In some aspects, the prioritization and routing functionality may be performed by a single network device. In others, these functions (e.g., the steps of any of the disclosed methods) may be split up and performed by multiple network devices on a single network operating as part of a QoS-based system. For example, an access point may be configured to tag network traffic incoming from a connected device (e.g., a user's computer) while the prioritization-related functionality is performed by routers and/or switches on the same network receiving traffic sent by the access point. The steps of the disclosed methods are modular in nature and it is readily understood that in various implementations the steps may be performed, together or individually, by different hardware resources.

Figure 5:
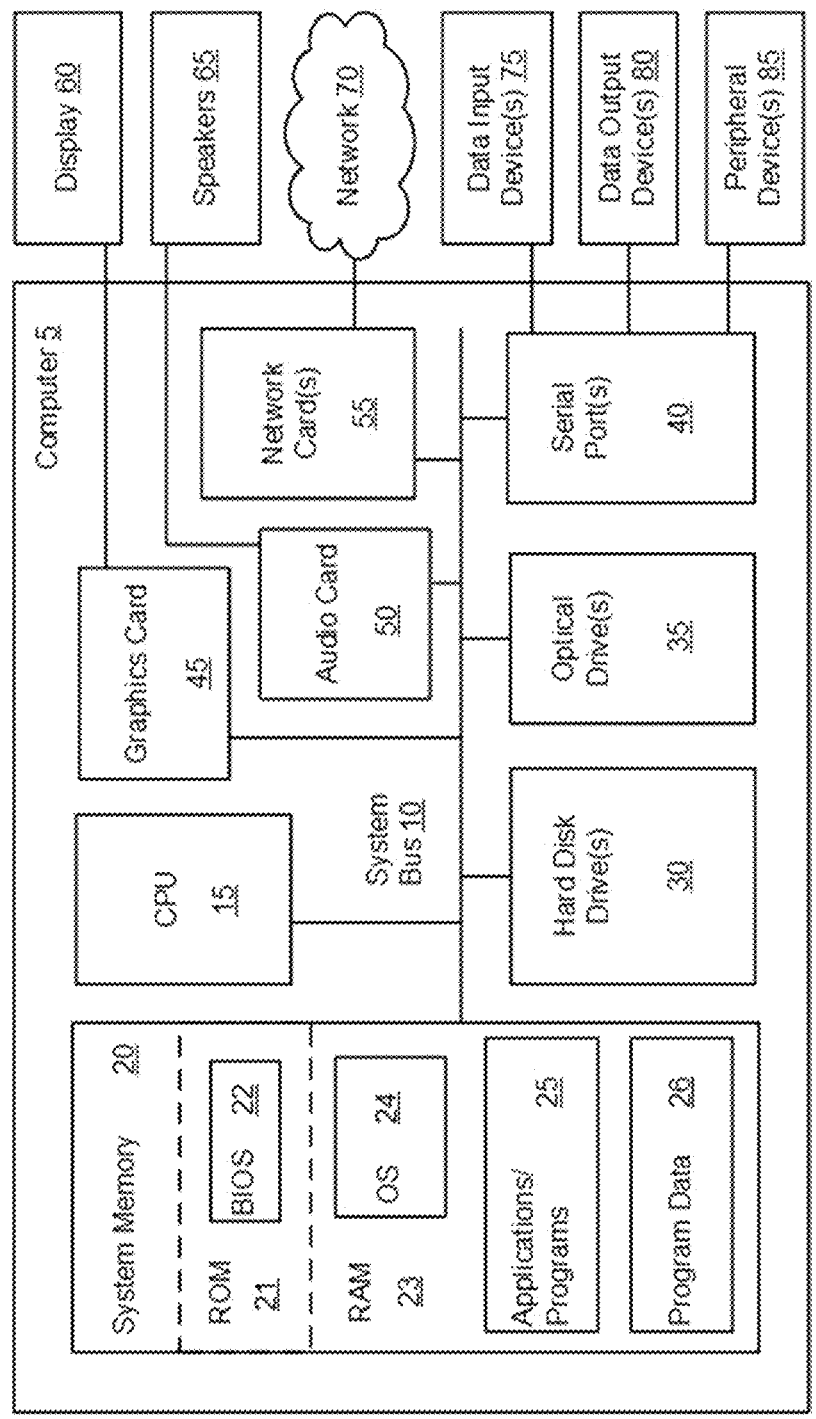
FIG. 5 is a diagram illustrating an example general-purpose computer system on which the systems and methods for prioritization of backup and recovery traffic may be implemented.

FIG. 5 depicts an exemplary aspect of a computer system 5 that may be used to implement the disclosed system and method for performing data backup. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240 M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The terms "component" and "module" as used herein mean a real-world device, apparatus, or arrangement of components or modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A component or module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each component or module can be realized in a variety of suitable configurations, and should not be limited to any particular implementation exemplified herein.

In the interest of clarity, not all of the routine features of the aspects are disclosed herein. It will be appreciated that in the development of any actual implementation of the disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for data backup, the method comprising:
   specifying a policy map, by a backup application executing on a local computer, which identifies Quality of Service (QoS) requirements for particular types of network traffic comprising one or more of data backup and recovery tasks, wherein the QoS requirements correspond to a network transmission priority level for each type of the network traffic, wherein the policy map further comprises triggers that elevate the network transmission priority level for one or more of the particular types of network traffic;
   receiving a data backup or recovery task, by the backup;
   analyzing, the data backup or recovery task, by the backup application, to determine its QoS requirements, based on the specified QoS requirements for data backup or recovery tasks specified in the policy map;
   applying, by the backup application, one or more QoS tags to data packets associated with the data backup or recovery task prior to transmission to a network, based on the determined QoS requirements;
   when network traffic unrelated to the backup or recovery task is detected, assigning, by the backup application, a network transmission priority level to the data packets, based on their QoS tags, that is lower than a priority level assigned to the network traffic unrelated to the backup or recovery task; and
   modifying, by the backup application, the policy map by adjusting the QoS requirements to increase transmission priority of the data backup or recovery tasks when network utilization is below a predetermined threshold for a predetermined period of time, activating the triggers in the policy map.

2. The method of claim 1, wherein the data backup or recovery task includes information comprising at least one of: a type of data backup or a time of data backup.

3. The method of claim 2, wherein applying QoS tags to data packets associated with the data backup or recovery task is based on at least one of the type of data backup or the time of data backup.

4. The method of claim 2, wherein the type of data backup is selected from one or more of: an ordinary planned backup, an event-based backup, or an urgent backup resulting from a predefined disaster condition.

5. The method of claim 2, wherein the data backup time is selected from one or more of: a peak time, a nighttime, and a weekends or holiday.

6. The method of claim 1, wherein the network transmission priority level is assigned to the data packets based upon a plurality of QoS tags applied to each data packet.

7. The method of claim 1, further comprising a step of: transmitting the QoS-tagged packets to one or more QoS-enabled routers on a same local network as the device executing the backup application, wherein the router(s) are configured to receive QoS-tagged backup or recovery traffic and to send it over the local network based on its QoS tags.

8. The method of claim 1, wherein the backup application is implemented via firmware on a network device.

9. A system for data backup, the system comprising:
one or more hardware processors of a local computer configured to:
specify a policy map which identifies (Quality of Service) QoS requirements for particular types of network traffic, comprising one or more of data backup and recovery tasks, wherein the QoS requirements correspond to a network transmission priority level for each type of the network traffic, wherein the policy map further comprises triggers that elevate the network transmission priority level for one or more of the particular types of network traffic;
receive a data backup or recovery task;
analyze the data backup or recovery task to determine its QoS requirements, based on the specified QoS requirements for data backup or recovery tasks specified in the policy map;
apply one or more QoS tags to data packets associated with the data backup or recovery task prior to transmission to a network, based on the determined QoS requirements;
when network traffic unrelated to the backup or recovery task is detected, assign a network transmission priority level to the data packets, based on their QoS tags, that is lower than a priority level assigned to the network traffic unrelated to the backup or recovery task; and
modifying the policy map by adjusting the QoS requirements to increase transmission priority of the data backup or recovery tasks when network utilization is below a predetermined threshold for a predetermined period of time, activating the triggers in the policy map.

10. The system of claim 9, wherein the data backup or recovery task includes information comprising at least one of: a type of data backup or a time of data backup.

11. The system of claim 10, wherein applying QoS tags to data packets associated with the data backup or recovery task is based on at least one of the type of data backup or the time of data backup.

12. The system of claim 10, wherein the type of data backup is selected from one or more of: an ordinary planned backup, an event based backup, or an urgent backup resulting from a predefined disaster condition.

13. The system of claim 10, wherein the data backup time is selected from one or more of: a peak time, a nighttime, and a weekends or holiday.

14. The system of claim 9, wherein the network transmission priority level is assigned to the data packets based upon a plurality of QoS tags applied to each data packet.

15. The system of claim 14, wherein the processor is further configured to transmit the QOS-tagged packets to one or more QoS-enabled routers on a same local network as the device executing the backup application, wherein the router(s) are configured to receive QoS-tagged backup or recovery traffic and to send it over the local network based on its QoS tags.

16. The system of claim 9, further comprising:
a network device which executes the backup application, wherein the backup application is implemented via firmware.

17. A non-transitory computer readable medium storing instructions thereon that when executed by a hardware processor, perform a method for performing data backup, the instructions comprising:
specifying a policy map, by a backup application executing on a local computer, which identifies QoS requirements for particular types of network traffic comprising one or more data backup and/or recovery tasks, wherein the QoS requirements correspond to a network transmission priority level for each type of the network traffic, wherein the policy map further comprises triggers that elevate the network transmission priority level for one or more of the particular types of network traffic;
receiving a data backup or recovery task, by the backup application;
analyzing the data backup or recovery task, by the backup application, to determine its QoS requirements, based on the specified QoS requirements for data backup or recovery tasks specified in the policy map;
applying, by the backup application, one or more QoS tags to data packets associated with the data backup or recovery task prior to transmission to a network, based on the determined QoS requirements;
when network traffic unrelated to the backup or recovery task is detected by the backup application, assigning a network transmission priority level to the data packets, based on their QoS tags, that is lower than a priority level assigned to the network traffic unrelated to the backup or recovery task; and
modifying the policy map by adjusting the QoS requirements to increase transmission priority of the data backup or recovery tasks when network utilization is below a predetermined threshold for a predetermined period of time, activating the triggers in the policy map.

18. The non-transitory computer readable medium of claim 17, wherein the data backup or recovery task includes information comprising at least one of: a type of data backup or a time of data backup.

19. The non-transitory computer readable medium of claim 18, wherein applying QoS tags to data packets associated with the data backup or recovery task is based on at least one of the type of data backup or the time of data backup.

20. The non-transitory computer readable medium of claim 18, wherein the type of data backup is selected from one or more of: an ordinary planned backup, an event based backup, or an urgent backup resulting from a disaster.

21. The non-transitory computer readable medium of claim 18, wherein the data backup time is selected from one or more of: a peak time, a nighttime, and a weekends or holiday.

* * * * *